(12) United States Patent
Burke (10) Patent No.: US 8,666,693 B2
(45) Date of Patent: Mar. 4, 2014

(54) LOW AVERAGE VELOCITY PEDESTRIAL MOTION IDENTIFICATION

(75) Inventor: John Michael Burke, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 226 days.

(21) Appl. No.: 13/034,503

(22) Filed: Feb. 24, 2011

(65) Prior Publication Data

US 2012/0221289 A1 Aug. 30, 2012

(51) Int. Cl.
*G01P 15/00* (2006.01)
*G06F 15/00* (2006.01)

(52) U.S. Cl.
USPC ............................................ 702/141; 73/509

(58) Field of Classification Search
USPC .......... 702/141, 142; 73/488, 1.38, 489, 495, 73/509, 510, 511
See application file for complete search history.

(56) References Cited

U.S. PATENT DOCUMENTS

| | | | |
|---|---|---|---|
| 6,826,477 B2 | 11/2004 | Ladetto et al. | |
| 7,042,391 B2 | 5/2006 | Meunier et al. | |
| 7,640,134 B2 * | 12/2009 | Park et al. | 702/141 |
| 7,640,804 B2 * | 1/2010 | Daumer et al. | 73/510 |
| 7,647,175 B2 | 1/2010 | Fateh | |
| 7,652,609 B2 | 1/2010 | Kim et al. | |
| 7,881,902 B1 * | 2/2011 | Kahn et al. | 702/160 |
| 2005/0222802 A1 | 10/2005 | Tamura et al. | |
| 2006/0174685 A1 | 8/2006 | Skvortsov et al. | |
| 2007/0067094 A1 * | 3/2007 | Park et al. | 701/200 |
| 2007/0125173 A1 | 6/2007 | Lin et al. | |
| 2007/0250261 A1 * | 10/2007 | Soehren | 701/207 |
| 2008/0105065 A1 * | 5/2008 | Lee et al. | 73/865.4 |
| 2008/0120062 A1 * | 5/2008 | Lee et al. | 702/160 |
| 2009/0192708 A1 * | 7/2009 | Yoo et al. | 701/213 |
| 2009/0319221 A1 * | 12/2009 | Kahn et al. | 702/141 |
| 2010/0001949 A1 | 1/2010 | Shkolnikov et al. | |
| 2010/0056872 A1 | 3/2010 | Kahn et al. | |
| 2010/0057397 A1 | 3/2010 | Takeishi et al. | |
| 2010/0064807 A1 | 3/2010 | Daumer et al. | |
| 2010/0217533 A1 * | 8/2010 | Nadkarni et al. | 702/19 |
| 2010/0302055 A1 | 12/2010 | Yaguchi | |
| 2011/0119027 A1 * | 5/2011 | Zhu et al. | 702/160 |
| 2012/0303319 A1 * | 11/2012 | Kirkeby | 702/160 |

OTHER PUBLICATIONS

International Search Report and Written Opinion—PCT/US2012/026657—ISA/EPO—Jun. 13, 2012.

\* cited by examiner

*Primary Examiner* — Jonathan C. Teixeira-Moffat
*Assistant Examiner* — Ruihua Zhang
(74) *Attorney, Agent, or Firm* — Michael Johnson (57) ABSTRACT

Systems and methods for identifying a motion state of a mobile device are disclosed. In one embodiment, identifying a motion state of a mobile device using acceleration signals from one or more accelerometers comprises: detecting any pedestrial steps associated with a user of the mobile device during an observation period based on the acceleration signals; determining a maximum number of consecutive pedestrial steps taken during the observation period from the detected pedestrial steps; and declaring a high average velocity motion state or a low average velocity motion state for the observation period based on the determined maximum number of consecutive pedestrial steps.

52 Claims, 3 Drawing Sheets

LOW AVERAGE VELOCITY PEDESTRIAN MOTION IDENTIFICATION

FIELD OF DISCLOSURE

The present disclosure relates generally to motion state identification, and more specifically to low average velocity motion state identification.

BACKGROUND

Microelectromechanical system (MEMS) sensors have recently been integrated within mobile devices to provide acceleration measurements for identifying movement. "Stationarity" of the mobile device (e.g., sitting unattended on a nightstand or desk) may be inferred from triaxial MEMS accelerometer signals when the acceleration change measured on all axes is insignificant. This type of movement detection operates independently from environmental RF signals, including those based on signals from wireless wide-area networks and local-area networks, as well as satellite or global positioning systems, and offers a way of optimizing cell phone performance if movement information is provided efficiently and accurately.

However, problems arise with conventional MEMS stationarity detection schemes because they tend to indicate movement when the device is "fidgeting," such as when the device is attached to a person's belt while sitting in a meeting or being held in a person's hand while standing conversing with a colleague, even though the mobile device is moving at low or near zero average velocity.

SUMMARY

Embodiments of the invention are directed to systems and methods for identifying a motion state of a mobile device.

In one aspect, a method is provided for identifying a motion state of a mobile device using acceleration signals from one or more accelerometers, comprising: detecting any pedestrian steps associated with a user of the mobile device during an observation period based on the acceleration signals; determining a maximum number of consecutive pedestrian steps taken during the observation period from the detected pedestrian steps; and declaring a high average velocity motion state or a low average velocity motion state for the observation period based on the determined maximum number of consecutive pedestrian steps.

In another aspect, an apparatus is provided for identifying a motion state of a mobile device using acceleration signals from one or more accelerometers. The apparatus comprises a step detector and a processor. The step detector is configured to detect any pedestrian steps associated with a user of the mobile device during an observation period based on the acceleration signals. The processor is configured to determine a maximum number of consecutive pedestrian steps taken during the observation period from the detected pedestrian steps, and to declare a high average velocity motion state or a low average velocity motion state for the observation period based on the determined maximum number of consecutive pedestrian steps.

In another aspect, an apparatus is provided for identifying a motion state of a mobile device using acceleration signals from one or more accelerometers, comprising: means for detecting any pedestrian steps associated with a user of the mobile device during an observation period based on the acceleration signals; means for determining a maximum number of consecutive pedestrian steps taken during the observation period from the detected pedestrian steps; and means for declaring a high average velocity motion state or a low average velocity motion state for the observation period based on the determined maximum number of consecutive pedestrian steps.

In another aspect, a computer-readable medium comprising code is provided, which, when executed by a processor, causes the processor to perform operations for identifying a motion state of a mobile device using acceleration signals from one or more accelerometers. The computer-readable medium comprises: code for detecting any pedestrian steps associated with a user of the mobile device during an observation period based on the acceleration signals; code for determining a maximum number of consecutive pedestrian steps taken during the observation period from the detected pedestrian steps; and code for declaring a high average velocity motion state or a low average velocity motion state for the observation period based on the determined maximum number of consecutive pedestrian steps.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the invention are disclosed in the following description and related drawings directed to specific embodiments of the invention. The term "embodiments of the invention" does not require that all embodiments of the invention include the discussed feature, advantage or mode of operation, and alternate embodiments may be devised without departing from the scope of the invention. Additionally, well-known elements of the invention will not be described in detail or will be omitted so as not to obscure the relevant details of the invention.

The terminology used herein is for the purpose of describing particular embodiments only and is not intended to be limiting of all embodiments of the invention. As used herein, the singular forms "a", "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

As discussed in the Background above, conventional MEMS accelerometer based motion state identification systems are not able to distinguish between low average velocity motion states (e.g., "fidgeting") and high average velocity motion states (e.g., continuous walking or running). However, the ability to accurately identify only high average velocity movement is desirable for a wide range of applications, such as cellular telephony and context aware computing, due to the ubiquity of fidgeting situations. Examples include wireless wide area network devices (e.g., for handoff searching and out-of-service situations), wireless local area network devices (e.g., for basic service set transition and signal drop situations), and global positioning system devices (e.g., for dynamic power optimization and loss of signal situations). Accordingly, techniques are provided herein for more particularly identifying a motion state of a mobile device.

Figure 1:
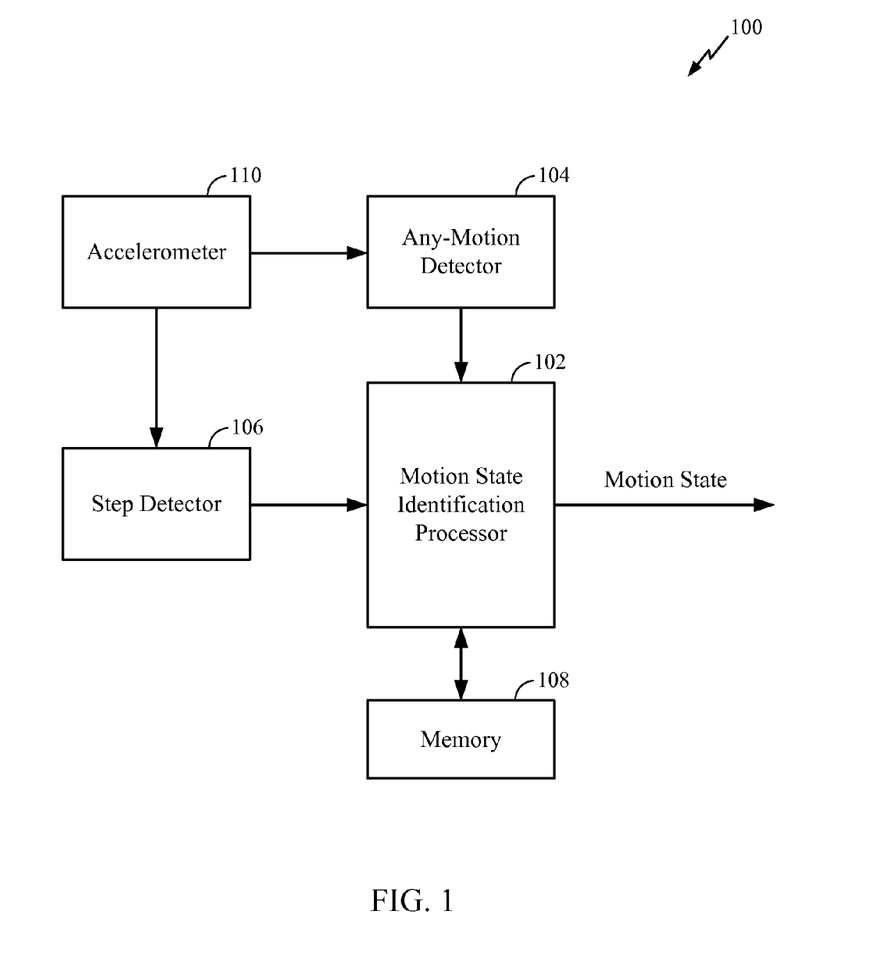
FIG. 1 illustrates a motion state identification device according to an example embodiment.

FIG. 1 illustrates a motion state identification device 100 according to an example embodiment. As shown, the motion state identification device 100 includes a motion state identification processor 102 that receives motion information from an "any-motion" detector 104 and step information from a step detector 106, and outputs a motion state identification. The motion state identification processor 102 is also coupled to a memory 108 configured to store related data and/or instructions. The any-motion detector 104 and step detector 106 operate according to acceleration signals received from an accelerometer 110. It will be appreciated that the any-motion detector 104 and step detector 106 may share the accelerometer 110 as shown, or may each have their own accelerometer, either internal or external to the respective detector. The accelerometer 110 is typically a triaxial accelerometer that provides acceleration data for three different axes. Other examples may include multiple (e.g., three) single axis accelerometers. Further, it will be appreciated that other devices from which acceleration may be derived can be used such as gyroscopes, so the embodiments should not be construed to be limited to the specific devices discussed herein.

The any-motion detector 104 detects whether the mobile device is "stationary" (i.e., whether a threshold level of movement has or has not been detected). For example, the any-motion detector 104 may monitor acceleration signals from the accelerometer 110 and determine an associated acceleration spread. Acceleration spread is the difference between the maximum and the minimum scalar acceleration values in a given observation window, where acceleration spread is deemed positive if the observation window minimum occurs before the maximum, and negative otherwise. If the maximum absolute value of acceleration spread is less than a specified threshold (e.g., a noise floor), the any-motion detector 104 determines that the mobile device is stationary. The noise floor threshold is typically on the order of a few hundredths of the acceleration due to gravity ($g_0$). In one design, the noise floor threshold was set to 0.016 $g_0$.

The step detector 106 detects pedestrian steps associated with a user of the mobile device. Step detection may be achieved in a variety of ways, but typically includes calculating scalar acceleration from triaxial accelerometer data, window averaging the scalar acceleration data, and calculating the acceleration spread. The acceleration spread may be amplitude filtered and time filtered to identify pedestrian steps. For example, a pedestrian step may be identified from the acceleration spread pattern when a minimum acceleration spread amplitude is maintained over a minimum step duration associated with pedestrian stepping. The minimum acceleration spread amplitude may be on the order of a few tenths of the acceleration due to gravity, and the minimum step duration may be on the order of a several hundredths of a second, for example. In one design, the minimum acceleration spread amplitude was set to 0.130 $g_0$, and the minimum step duration was set to 0.070 s. When a pedestrian step is detected, the step detector 106 outputs a time stamp associated with the detected step, and provides the time stamp to the motion state identification processor 102.

As discussed above, not all pedestrian steps detected by the step detector 106 correspond to actual walking or running steps by the user of the mobile device. The motion state identification processor 102 therefore performs further processing to distinguish low average velocity motion states (e.g., "fidgeting") from the high average velocity motion states typically of interest (e.g., continuous walking or running). Operation of the motion state identification processor 102 is explained in more detail below with reference to FIGS. 2 and 3.

Figure 2:
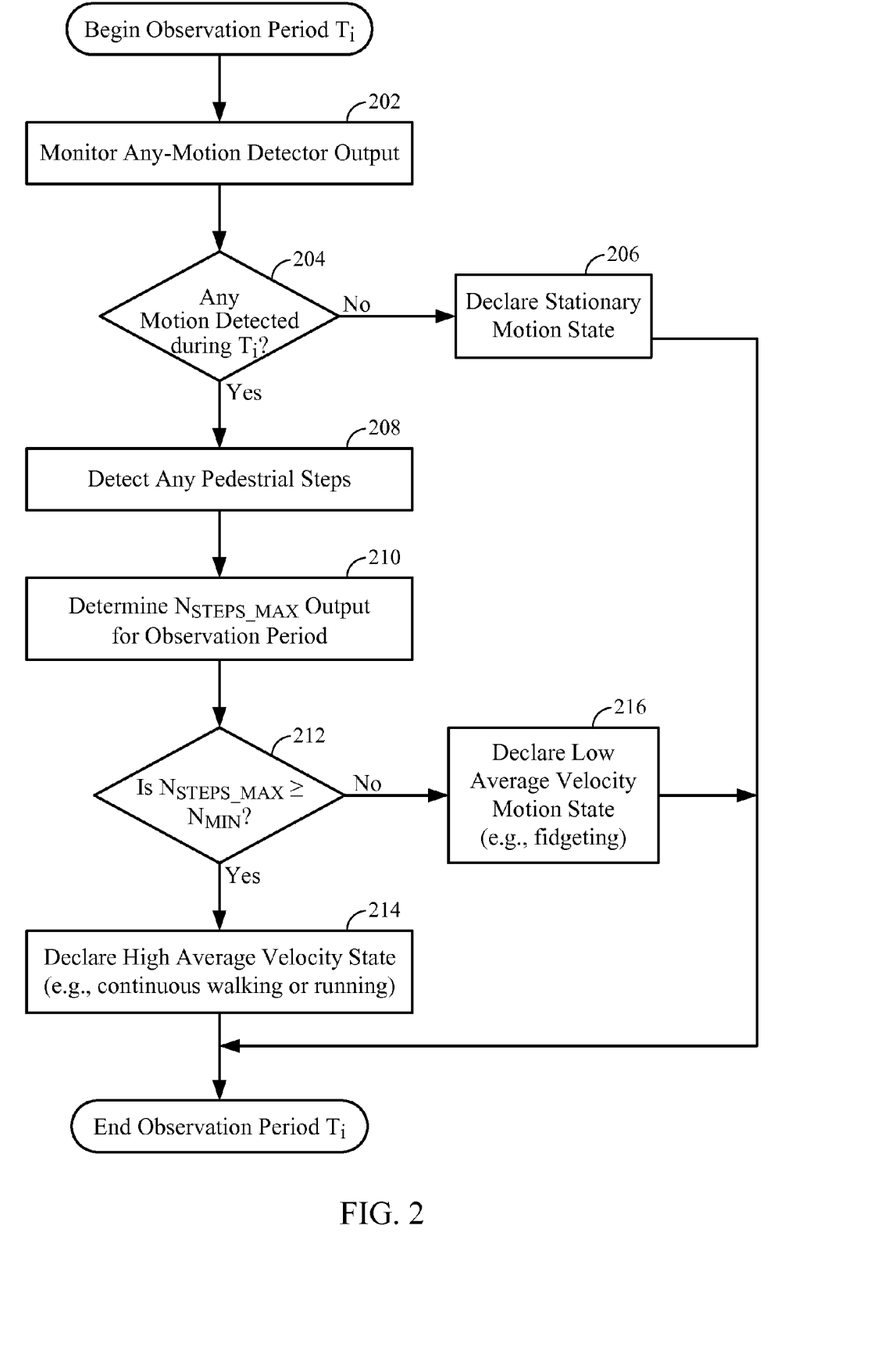
FIG. 2 illustrates a method of identifying a motion state of a mobile device according to an example embodiment.

FIG. 2 illustrates a method of identifying a motion state of a mobile device according to an example embodiment. The motion state identification process of FIG. 2 may be performed periodically in accordance with a given observation period $T_i$ and provides the ability to declare one of three distinct motion states: (1) a stationary motion state, (2) a low average velocity motion state, or (3) a high average velocity motion state, for each respective observation period $T_i$. Experimentation by the inventors has revealed that the length of the observation period $T_i$ may be tailored to allow the three distinct motion states to be distinguished from one another. For example, while a mobile device such as a cellular telephone carried by a person might be deemed stationary when observed over shorter periods of time, it is unlikely that the person will be able to hold the mobile device in his or her hand steady enough for it to be judged stationary over longer periods of time. Similarly, even though the cellular telephone may sometimes be moved in a manner indistinguishable from individual walking or running steps during fidgeting situations, this behavior is unlikely to occur continuously over longer periods of time. Accordingly, the observation period $T_i$ may be configurable (e.g., by a system designer or an invoking application) and may be set to a time scale associated with human motion. For example, in some designs the observation period $T_i$ may be on the order of one or more seconds (e.g., between about two seconds and about ten seconds). In one design, the observation period $T_i$ was set to five seconds. However, it will be appreciated that the particular length of the observation period $T_i$ that is selected will be application specific, and may vary from application to application.

Returning to FIG. 2, the motion state identification processor 102 begins each observation period $T_i$ by monitoring an output from the any-motion detector 104 (block 202) to determine if any-motion of the mobile device has occurred (block 204). As discussed above with reference to FIG. 1, the any-motion detector 104 outputs an indication of whether the mobile device is "stationary" (i.e., whether a threshold level of movement has or has not been detected). If no motion is detected, the motion state identification processor 102 declares a stationary motion state (block 206). Using the any-motion detector 104 to detect any possible motion of the mobile device may provide significant power savings in some designs, such as battery powered mobile devices. For example, if the any-motion detector provides a negative output, the motion state identification processor 102 may safely declare a stationary state and effectively forgo any further motion state identification procedures for that observation period $T_i$, thereby conserving power for the mobile device.

If possible, motion is detected by the any-motion detector 104, the motion state identification processor 102 begins to monitor the step detector 106 to detect any pedestrian steps associated with a user of the mobile device during the observation period $T_i$ (block 208). For power conservation reasons, in some designs the step detector 106 may remain dormant until initial motion is detected and it is activated by the motion state identification processor 102. As discussed above, the step detector 106 monitors acceleration signals (e.g., triaxial accelerometer data) from the accelerometer 110 and outputs a time stamp corresponding to each identified pedestrian step.

Using the output(s) of the step detector 106, the motion state identification processor 102 determines a maximum number of consecutive pedestrian steps $N_{STEPS\_MAX}$ taken during the observation period $T_i$ (block 210). An example procedure for determining the maximum number of consecutive pedestrian steps $N_{STEPS\_MAX}$ is explained below with reference to FIG. 3.

Figure 3:
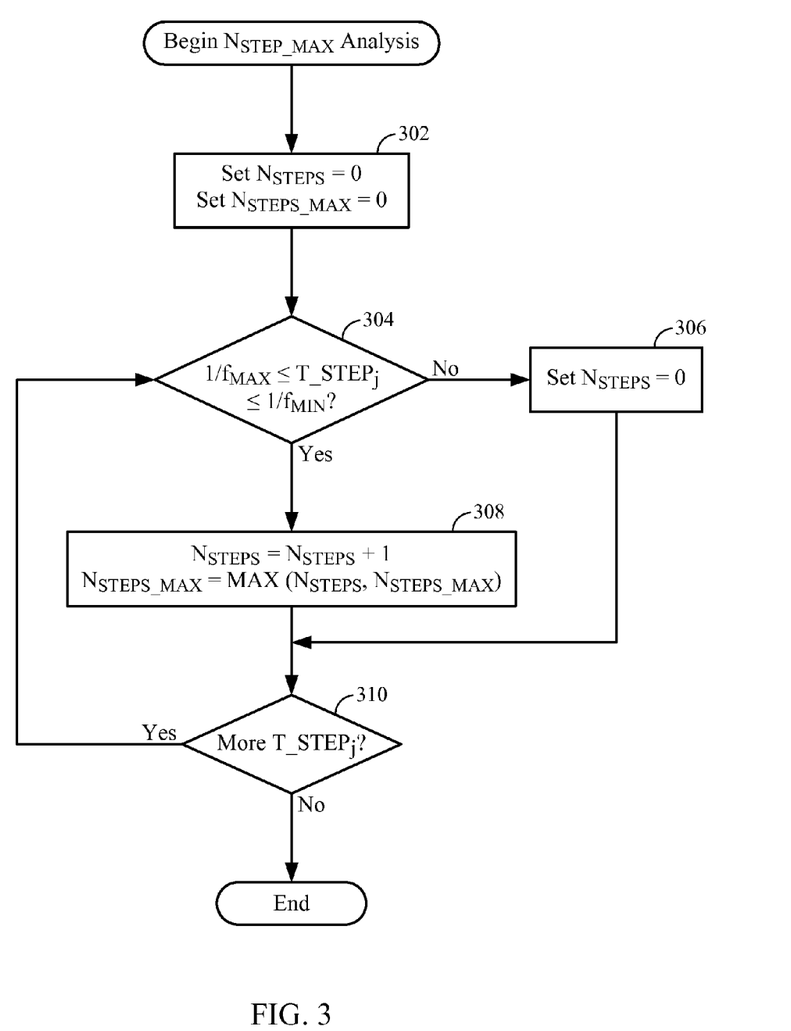
FIG. 3 illustrates the determination of a maximum number of consecutive pedestrian steps taken during a given observation period according to an example embodiment.

FIG. 3 illustrates the determination of a maximum number of consecutive pedestrian steps $N_{STEPS\_MAX}$ taken during a given observation period $T_i$ according to an example embodiment. As shown, two counters are used, including one for a number of continuous pedestrial steps $N_{STEPS}$ and one for a maximum number of consecutive pedestrial steps $N_{STEPS\_MAX}$, and both are initially set to zero (block 302). The motion state identification processor 102 then analyzes the sequence of step time stamps provided by the step detector 106 over the observation period of interest $T_i$ by comparing the time intervals between each detected step $T\_STEP_j$ to maximum and minimum step frequency requirements $f_{MAX}$ and $f_{MIN}$ (block 304). Each $T\_STEP_j$ may be calculated as the difference between successive step time stamps, with the time stamp of the last step detected during the previous observation period $T_{i-1}$ being used to determine the step interval of the first step $T\_STEP_1$ of the current observation period $T_i$.

The maximum and minimum step frequency requirements $f_{MAX}$ and $f_{MIN}$ correspond to time intervals between steps that are indicative of actual, sustained pedestrian motion (e.g., continuous walking or running) as opposed to mere fidgeting. Experimentation by the inventors has revealed that steps associated with actual pedestrian motion occur within a range of characteristic time intervals between successive steps. For example, a person holding a cellular telephone that sits down in a chair may cause an isolated step to be detected, even though actual pedestrian motion of the type at interest has not occurred. This step may be distinguished as fidgeting by the fact that it is uncharacteristically isolated from other steps. Similarly, a person holding a cellular telephone and tapping it against their palm may cause a series of steps to be detected, even though again actual pedestrian motion of the type at interest has not occurred. This series of steps can likewise be distinguished as fidgeting by the fact that the steps occur uncharacteristically close together. Accordingly, the maximum frequency requirement $f_{MAX}$ is imposed to filter out step intervals that appear too short to represent actual pedestrian motion, while the minimum step frequency requirement $f_{MIN}$ is imposed to filter out step intervals that appear too long to represent actual pedestrian motion.

If a given step interval $T\_STEP_j$ reported during the observation period $T_i$ indicates that successive steps have occurred within the acceptable step frequency requirements $f_{MAX}$ and $f_{MIN}$, the number of consecutive pedestrian steps $N_{STEPS}$ is incremented, and the maximum number of consecutive pedestrian steps $N_{STEPS\_MAX}$ is set to either the current value of consecutive pedestrian steps $N_{STEPS}$ or the current value of the maximum number of consecutive pedestrian steps $N_{STEPS\_MAX}$, whichever is greater (block 306). Otherwise, if a given step interval $T\_STEP_j$ reported during the observation period $T_i$ indicates that the successive steps occurred outside of the acceptable step frequency requirements $f_{MAX}$ and $f_{MIN}$, the number of consecutive pedestrian steps $N_{STEPS}$ is reset to zero (block 308). In this case, the maximum number of consecutive pedestrian steps $N_{STEPS\_MAX}$ is maintained at its current value. This series of determinations and calculations is repeated for each step interval $T\_STEP_j$ in the current observation period $T_i$ (block 310).

As for the observation period T, the maximum and minimum step frequency requirements $f_{MAX}$ and $f_{MIN}$ may be configurable, and are typically set to a time scale associated with human motion. For example, in some designs the maximum and minimum step frequency requirements $f_{MAX}$ and $f_{MIN}$ may be on the order of a few steps per second (e.g., between about two and three steps per second for $f_{MAX}$, and between about one and two steps per second for $f_{MIN}$). In one design, the minimum step frequency requirement $f_{MIN}$ was set to 1.40 Hz, and the maximum step frequency requirement $f_{MAX}$ was set to 2.80 Hz. However, also as for the observation period T, it will be appreciated that the particular values for $f_{MAX}$ and $f_{MIN}$ that are selected will be application specific, and may vary from application to application.

Returning to FIG. 2, once the maximum number of consecutive pedestrian steps $N_{STEPS\_MAX}$ taken during the current observation period $T_i$ is determined (block 210), the motion state identification processor 102 compares it to a minimum threshold number of continuous steps $N_{MIN}$ (block 212). The minimum threshold number of continuous steps $N_{MIN}$ corresponds to a minimum number of continuous pedestrian steps required for the motion state identification processor 102 to determine that sustained pedestrian motion has occurred. For example, a relatively low number of consecutive pedestrian steps, or none at all, likely indicates that any detected pedestrian steps do not correspond to actual, sustained pedestrian motion. The minimum threshold number of continuous steps $N_{MIN}$ is naturally dependent on the length of the observation period $T_i$ selected, as well as characteristics of human walking. In some designs, the minimum threshold number of continuous steps $N_{MIN}$ may be set roughly equivalent to the number of seconds in the observation period (e.g., for an observation period $T_i$ of five seconds, the minimum threshold number of continuous steps $N_{MIN}$ may be set to five continuous steps). For relatively short observation periods T, the minimum threshold number of continuous steps $N_{MIN}$ may be slightly larger. It will be appreciated that the particular minimum threshold number of continuous steps $N_{MIN}$ that is selected will be application specific, and may vary from application to application.

If the maximum number of consecutive pedestrian steps $N_{STEPS\_MAX}$ taken during the current observation period $T_i$ meets or exceeds the threshold $N_{MIN}$, the motion state identification processor 102 declares a high average velocity motion state for the mobile device for the current observation period $T_i$ (block 214). Otherwise, if the maximum number of consecutive pedestrian steps $N_{STEPS\_MAX}$ taken during the current observation period $T_i$ is below the threshold $N_{MIN}$, the motion state identification processor 102 declares a low average velocity motion state for the mobile device for the current observation period $T_i$ (block 216).

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. Further, the functionality associated with each illustrative logical blocks, modules, and circuits may be partially or fully subsumed by a different component, shown or not shown, in other embodiments. For example, the any-motion detector 104 and/or step detector 106 functionality may be integrated directly into the motion state identification processor 102, or the motion state identification processor 102 functionality may be performed by a general purpose processor of the mobile device employing the motion state identification device 100. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In addition, for each of the embodiments described herein, the corresponding form of any such embodiments may be described herein as, for example, "logic configured to" perform the described action.

It will be appreciated that the various logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. In addition, information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of identifying a motion state of a mobile device using acceleration signals from one or more accelerometers, comprising:
   detecting any pedestrian steps associated with a user of the mobile device during an observation period based on the acceleration signals;
   determining via a processor a maximum number of consecutive pedestrian steps taken during the observation period from the detected pedestrian steps; and
   declaring via the processor either a high average velocity motion state or a low average velocity motion state for the observation period based on the determined maximum number of consecutive pedestrian steps taken during the observation period, wherein high average velocity motion states are distinguished from low average velocity motion states based on the number of steps in the determined maximum number of consecutive pedestrian steps.

2. The method of claim 1, wherein the low average velocity motion state corresponds to fidgeting by the user.

3. The method of claim 1, wherein the high average velocity motion state corresponds to continuous walking or running by the user.

4. The method of claim 1, wherein detecting any pedestrian steps associated with the user comprises:
   calculating an acceleration spread pattern from the acceleration signals; and identifying any peaks in the acceleration spread pattern that meet or exceed a minimum acceleration spread amplitude over a minimum time duration.

5. The method of claim 1, wherein two or more consecutive pedestrian steps satisfy one or more step frequency requirements.

6. The method of claim 5, wherein the one or more step frequency requirements comprise a minimum frequency requirement of about 1.40 steps per second and a maximum frequency requirement of about 2.80 steps per second for successive steps to be deemed consecutive.

7. The method of claim 5, wherein determining the maximum number of consecutive pedestrian steps comprises:
   calculating a time interval between successive pedestrian steps for each pedestrian step detected during the observation period;

comparing each time interval to the one or more step frequency requirements; and identifying a maximum number of successive pedestrial steps detected during the observation period that have a time interval meeting the one or more step frequency requirements.

8. The method of claim 1, wherein the high average velocity motion state is declared for the observation period when the determined maximum number of consecutive pedestrial steps meets or exceeds a threshold, and the low average velocity motion state is declared for the observation period when the determined maximum number of consecutive pedestrial steps is below the threshold.

9. The method of claim 8, wherein the threshold equals about one consecutive pedestrial step per second of the observation period.

10. The method of claim 1, further comprising:
monitoring stationarity of the mobile device based on an acceleration change over time determined from the acceleration signals; and
declaring a stationary motion state for the observation period if the acceleration change over time measured on all accelerometer axes is less than one or more predetermined thresholds during the observation period.

11. The method of claim 1, wherein the observation period is at least one second.

12. The method of claim 1, wherein the observation period is between about two seconds and about ten seconds.

13. The method of claim 1, further comprising repeating the detecting, determining, and declaring over one or more subsequent observation periods.

14. An apparatus for identifying a motion state of a mobile device using acceleration signals from one or more accelerometers, comprising:
a step detector configured to detect any pedestrial steps associated with a user of the mobile device during an observation period based on the acceleration signals; and
a processor configured to determine a maximum number of consecutive pedestrial steps taken during the observation period from the detected pedestrial steps, and to declare either a high average velocity motion state or a low average velocity motion state for the observation period based on the determined maximum number of consecutive pedestrial steps taken during the observation period, wherein high average velocity motion states are distinguished from low average velocity motion states based on the number of steps in the determined maximum number of consecutive pedestrial steps.

15. The apparatus of claim 14, wherein the low average velocity motion state corresponds to fidgeting by the user.

16. The apparatus of claim 14, wherein the high average velocity motion state corresponds to continuous walking or running by the user.

17. The apparatus of claim 14, wherein the step detector is configured to detect any pedestrial steps associated with the user by:
calculating an acceleration spread pattern from the acceleration signals; and
identifying any peaks in the acceleration spread pattern that meet or exceed a minimum acceleration spread amplitude over a minimum time duration.

18. The apparatus of claim 14, wherein two or more consecutive pedestrial steps satisfy one or more step frequency requirements.

19. The apparatus of claim 18, wherein the one or more step frequency requirements comprise a minimum frequency requirement of about 1.40 steps per second and a maximum frequency requirement of about 2.80 steps per second for successive steps to be deemed consecutive.

20. The apparatus of claim 18, wherein the processor is configured to determine the maximum number of consecutive pedestrial steps by:
calculating a time interval between successive pedestrial steps for each pedestrial step detected during the observation period;
comparing each time interval to the one or more step frequency requirements; and
identifying a maximum number of successive pedestrial steps detected during the observation period that have a time interval meeting the one or more step frequency requirements.

21. The apparatus of claim 14, wherein the processor is configured to declare the high average velocity motion state for the observation period when the determined maximum number of consecutive pedestrial steps meets or exceeds a threshold, and to declare the low average velocity motion state for the observation period when the determined maximum number of consecutive pedestrial steps is below the threshold.

22. The apparatus of claim 21, wherein the threshold equals about one consecutive pedestrial step per second of the observation period.

23. The apparatus of claim 14, further comprising an any-motion detector configured to:
monitor stationarity of the mobile device based on an acceleration change over time determined from the acceleration signals; and
declaring a stationary motion state for the observation period if the acceleration change over time measured on all accelerometer axes is less than one or more predetermined thresholds during the observation period.

24. The apparatus of claim 14, wherein the observation period is at least one second.

25. The apparatus of claim 14, wherein the observation period is between about two seconds and about ten seconds.

26. The apparatus of claim 14, wherein the step detector and the processor are configured to repeat the detecting, determining, and declaring over one or more subsequent observation periods.

27. An apparatus for identifying a motion state of a mobile device using acceleration signals from one or more accelerometers, comprising:
means for detecting any pedestrial steps associated with a user of the mobile device during an observation period based on the acceleration signals;
means for determining a maximum number of consecutive pedestrial steps taken during the observation period from the detected pedestrial steps; and
means for declaring either a high average velocity motion state or a low average velocity motion state for the observation period based on the determined maximum number of consecutive pedestrial steps taken during the observation period, wherein high average velocity motion states are distinguished from low average velocity motion states based on the number of steps in the determined maximum number of consecutive pedestrial steps.

28. The apparatus of claim 27, wherein the low average velocity motion state corresponds to fidgeting by the user.

29. The apparatus of claim 27, wherein the high average velocity motion state corresponds to continuous walking or running by the user.

30. The apparatus of claim 27, wherein the means for detecting any pedestrian steps associated with the user comprises:
   means for calculating an acceleration spread pattern from the acceleration signals; and
   means for identifying any peaks in the acceleration spread pattern that meet or exceed a minimum acceleration spread amplitude over a minimum time duration.

31. The apparatus of claim 27, wherein two or more consecutive pedestrian steps satisfy one or more step frequency requirements.

32. The apparatus of claim 31, wherein the one or more step frequency requirements comprise a minimum frequency requirement of about 1.40 steps per second and a maximum frequency requirement of about 2.80 steps per second for successive steps to be deemed consecutive.

33. The apparatus of claim 31, wherein the means for determining the maximum number of consecutive pedestrian steps comprises:
   means for calculating a time interval between successive pedestrian steps for each pedestrian step detected during the observation period;
   means for comparing each time interval to the one or more step frequency requirements; and
   means for identifying a maximum number of successive pedestrian steps detected during the observation period that have a time interval meeting the one or more step frequency requirements.

34. The apparatus of claim 27, wherein the high average velocity motion state is declared for the observation period when the determined maximum number of consecutive pedestrian steps meets or exceeds a threshold, and the low average velocity motion state is declared for the observation period when the determined maximum number of consecutive pedestrian steps is below the threshold.

35. The apparatus of claim 34, wherein the threshold equals about one consecutive pedestrian step per second of the observation period.

36. The apparatus of claim 27, further comprising:
   means for monitoring stationarity of the mobile device based on an acceleration change over time determined from the acceleration signals; and
   means for declaring a stationary motion state for the observation period if the acceleration change over time measured on all accelerometer axes is less than one or more predetermined thresholds during the observation period.

37. The apparatus of claim 27, wherein the observation period is at least one second.

38. The apparatus of claim 27, wherein the observation period is between about two seconds and about ten seconds.

39. The apparatus of claim 27, further comprising means for repeating the detecting, determining, and declaring over one or more subsequent observation periods.

40. A non-transitory computer-readable medium comprising code, which, when executed by a processor, causes the processor to perform operations for identifying a motion state of a mobile device using acceleration signals from one or more accelerometers, the non-transitory computer-readable medium comprising:
   code for detecting any pedestrian steps associated with a user of the mobile device during an observation period based on the acceleration signals;
   code for determining a maximum number of consecutive pedestrian steps taken during the observation period from the detected pedestrian steps; and
   code for declaring either a high average velocity motion state or a low average velocity motion state for the observation period based on the determined maximum number of consecutive pedestrian steps taken during the observation period, wherein high average velocity motion states are distinguished from low average velocity motion states based on the number of steps in the determined maximum number of consecutive pedestrian steps.

41. The non-transitory computer-readable medium of claim 40, wherein the low average velocity motion state corresponds to fidgeting by the user.

42. The non-transitory computer-readable medium of claim 40, wherein the high average velocity motion state corresponds to continuous walking or running by the user.

43. The non-transitory computer-readable medium of claim 40, wherein the code for detecting any pedestrian steps associated with the user comprises:
   code for calculating an acceleration spread pattern from the acceleration signals; and
   code for identifying any peaks in the acceleration spread pattern that meet or exceed a minimum acceleration spread amplitude over a minimum time duration.

44. The non-transitory computer-readable medium of claim 40, wherein two or more consecutive pedestrian steps satisfy one or more step frequency requirements.

45. The non-transitory computer-readable medium of claim 44, wherein the one or more step frequency requirements comprise a minimum frequency requirement of about 1.40 steps per second and a maximum frequency requirement of about 2.80 steps per second for successive steps to be deemed consecutive.

46. The non-transitory computer-readable medium of claim 44, wherein the code for determining the maximum number of consecutive pedestrian steps comprises:
   code for calculating a time interval between successive pedestrian steps for each pedestrian step detected during the observation period;
   code for comparing each time interval to the one or more step frequency requirements; and
   code for identifying a maximum number of successive pedestrian steps detected during the observation period that have a time interval meeting the one or more step frequency requirements.

47. The non-transitory computer-readable medium of claim 40, wherein the high average velocity motion state is declared for the observation period when the determined maximum number of consecutive pedestrian steps meets or exceeds a threshold, and the low average velocity motion state is declared for the observation period when the determined maximum number of consecutive pedestrian steps is below the threshold.

48. The non-transitory computer-readable medium of claim 47, wherein the threshold equals about one consecutive pedestrian step per second of the observation period.

49. The non-transitory computer-readable medium of claim 40, further comprising:
   code for monitoring stationarity of the mobile device based on an acceleration change over time determined from the acceleration signals; and
   code for declaring a stationary motion state for the observation period if the acceleration change over time measured on all accelerometer axes is less than one or more predetermined thresholds during the observation period.

50. The non-transitory computer-readable medium of claim 40, wherein the observation period is at least one second.

51. The non-transitory computer-readable medium of claim 40, wherein the observation period is between about two seconds and about ten seconds.

52. The non-transitory computer-readable medium of claim 40, further comprising code for repeating the detecting, determining, and declaring over one or more subsequent observation periods.

* * * * *